April 10, 1951      P. EDBERG      2,548,426
AIR CONDITIONING
Filed Feb. 7, 1947
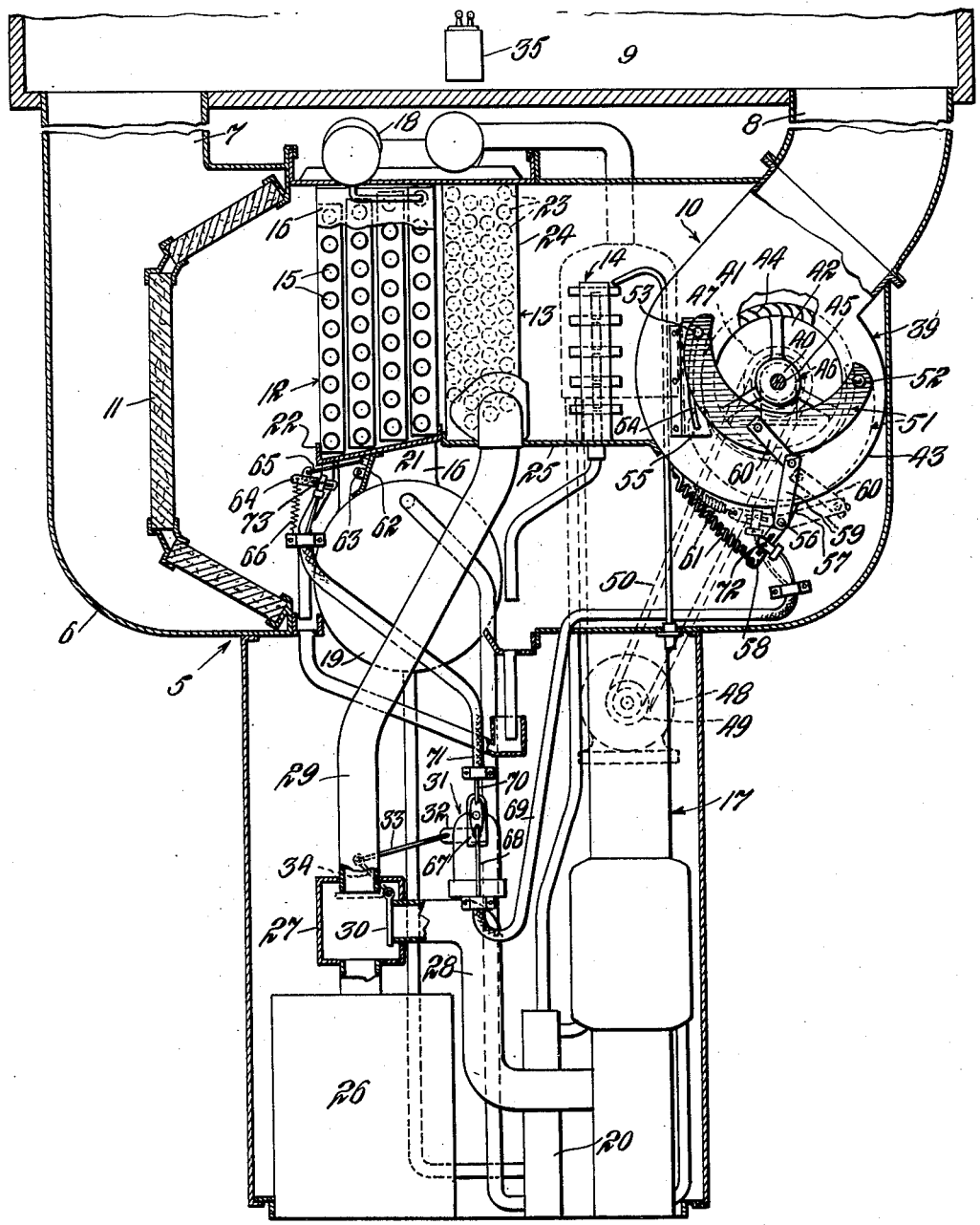
INVENTOR.
Per Edberg
BY
Oliver S. Titcomb
his ATTORNEY Patented Apr. 10, 1951

2,548,426

UNITED STATES PATENT OFFICE 2,548,426

AIR-CONDITIONING

Per Edberg, Evansville, Ind., assignor to Servel, Inc., New York, N. Y., a corporation of Delaware Application February 7, 1947, Serial No. 727,076

10 Claims. (Cl. 257—9)

The present invention relates to an air conditioner and more particularly to apparatus for regulating the flow of air to an enclosure to be conditioned.

The air conditioner has a circulating fan which delivers air to an enclosure through a conditioning chamber where it is heated and humidified in winter or cooled and dehumidified in summer as required. When the conditioner is located in a region where the heating requirements in winter are the same as the cooling requirements in summer, the circulating fan will deliver the same amount of air to the enclosure to be conditioned when either heating or cooling. Such a balance of heating and cooling requirements, however, is rarely encountered in practice. In northern climes more heating than cooling is required. In southern climes more cooling than heating is required. In some installations all of the rooms of the enclosure are heated in winter while only some of the rooms are cooled in summer. In other installations the heating requirements are small while dehumidification by cooling is comparatively great.

Furthermore, when the conditioner is operating to cool the air in hot weather, it may be desirable to deliver a maximum amount of air to the enclosure even though it is not cooled to a degree possible with a lesser amount of air as the movement of air increases the comfort of the occupants in the enclosure. On the other hand, when the conditioner is operating to heat the air in cold weather all of the air delivered to the enclosure should be substantially heated before it is delivered to the enclosure as the circulation of air at room temperature is apt to produce a chilling effect upon the occupants.

The rate of operation of the heating and cooling systems and the speed and capacity of the fan may be initially adjusted for particular conditions when the air conditioner is installed. However, if the speed and capacity of the fan is adjusted to deliver the proper amount of air for a particular conditioning operation such as cooling, it may deliver too much air for heating. On the other hand, if the rate of operation of the heating system and capacity of the fan is adjusted to deliver a maximum amount of air for heating, the increased velocity and amount of air passing through the conditioning chamber may be too great for cooling. For example, the high velocity air may sweep moisture from the cooling element and into the air stream as fast as it is condensed from the air so that the air will not be properly dehumidified. Furthermore, the flow of air at high velocity may also interfere with the proper evaporation of refrigerant in the evaporator of the refrigeration system.

One of the objects of the present invention is to increase the flexibility of an air conditioner for particular installations by regulating the rate of air circulation in accordance with the heating and cooling requirements.

Another object is to provide apparatus in an air conditioner to cause air to be delivered at required capacity for one conditioning operation such as cooling, and reduce the amount of air delivered for another conditioning operation such as heating.

Another object is to provide mechanism in an air conditioner for adjusting the circulating fan to change its capacity when heating and cooling, respectively.

Another object is to provide movable shutters cooperating with the air inlet to the circulating fan for restricting the flow of air thereto to change the capacity of the fan.

Another object is to provide a by-pass damper operable either separately or in conjunction with the fan shutters to change the rate of air circulation during heating and cooling operations, respectively.

Still another object is to provide a selective control mechanism for adjusting the air conditioner for a heating or cooling operation and shifting the by-pass damper and fan shutters.

These and other objects will become more apparent from the following description and drawing. It is to be expressly understood, however, that the drawing is for the purpose of illustration only and not a definition of the limits of the invention, reference being had for this purpose to the appended claims.

In the drawing:

The single figure diagrammatically illustrates an air conditioner incorporating the air regulating apparatus of the present invention.

The air conditioner illustrated in the drawing is of unitary construction enclosed in a generally T-shaped casing 5. The upper part of the casing 5 comprises a conditioning chamber 6 and ducts 7 and 8 connect the chamber to the enclosure 9 to be conditioned. A circulating fan 10 at one end of the chamber 6 draws air from the enclosure through the duct 7 and into the chamber and delivers the air back to the enclosure through the duct 8. Mounted in the conditioning chamber 6 in the direction of air flow is a filter 11, cooling element 12, heating element 13, humidifier 14, and fan 10. Thus, air in the enclosure 9 is filtered and then cooled and dehumidified or heated and humidified in accordance with requirements as it circulates through the conditioning chamber 6.

The cooling element 12 constitutes the evaporator of a suitable refrigeration system and comprises a plurality of rows of tubes 15 extending between headers 16 adjacent the side walls of the casing 5, the tubes of each row being provided with common heat transfer fins. As illustrated in the drawing, refrigerant is supplied to the cooling element or evaporator 12 by an absorption refrigeration system of the type illustrated and described in the United States Letters Patent to Albert R. Thomas, No. 2,282,503, issued May 12, 1942 and entitled Refrigeration. Suffice to state herein that the refrigeration system comprises a generator 17, condenser 18, evaporator 12, absorber 19 and heat exchanger 20 interconnected for the circulation of refrigerant and absorbent when heat is supplied to the generator. The evaporator 12 overlies and is vertically spaced from the absorber 19 to provide opening 21 therebetween and the headers 16 extend down and are connected to the top of the absorber at opposite ends of the opening. Underlying the evaporator 12 is a combined drain pan and bottom wall 22 for directing the air to cause it to flow over the evaporator tubes 15.

The heating element 13 is in the form of a radiator and also comprises a plurality of closely adjacent tubes 23 extending between headers 24 adjacent the side walls of the casing 5. The heating element or radiator 13 is positioned closely adjacent the cooling element 12 in the conditioning chamber 6 and a wall 25 underlies the heating element and forms a continuation of the bottom wall 22 to the circulating fan 10.

Heating steam is supplied from a steam boiler 26 to either the radiator 13 of the heating system or to the generator 17 of the refrigeration system. As illustrated diagrammatically in the drawing, steam is delivered from the boiler 26 to the chamber 27 of a selector valve and may be caused to flow to the generator 17 of the refrigeration system through the conduit 28 or to the radiator or heating element 13 through the conduit 29 as controlled by the movable valve element 30. The ends of the conduits 28 and 29 extend into the sides of the valve chamber 27 at right angles to each other and the movable valve element 30 is pivotally mounted for rocking movement from the full-line position to the dotted-line position illustrated. When the movable valve element 30 is in the full-line position, steam from the boiler 26 flows through the conduit 29 to the heating element 13. When the valve element 30 is shifted to the dotted-line position, it closes the conduit 29 so that steam is delivered through the conduit 28 to the generator 17. The valve element 30 is operated automatically by a servo-motor 31 having a crank arm 32 connected by a link 33 to a crank arm 34 for operating the valve element 30. Motor 31 is constructed to rotate only 180° when energized and its motion is transmitted through the crank arm 32 and link 33 to rock the valve 30 from one to the other of its two positions. Operation of the motor 31 may be initiated by a suitable controller such as a combined selector and thermostat 35 in the enclosure 9 to be conditioned.

In accordance with the present invention the speed and capacity of the circulating fan 10 is initially adjusted when the air conditioner is installed and the fan is provided with mechanism for further adjusting the fan to change its capacity when the conditioner is shifted from one conditioning operation to the other to adapt it for the requirements of the particular installation.

In the drawing, a centrifugal type fan is illustrated which is of unitary construction comprising a scroll casing 39 and wheel 40 mounted for rotation in the casing. The scroll casing has parallel side walls 41 with air inlet openings 42 and a curved peripheral wall 43. The wheel 40 is of hollow cylindrical form with blades 44 on its periphery and is positioned in the scroll casing 39 concentrically with air inlet openings 42. The wheel 40 is mounted fast on a shaft 45 journaled in suitable bearings 46 and having a pulley 47 adjacent one end. The shaft 45 is driven from a motor 48 having a pulley 49 by means of a belt 50.

The speed and capacity of the circulating fan 10 is initially adjusted by selecting a motor driving pulley 49 and driven fan shaft pulley 47 of the proper sizes to give the desired speed ratio. Thus, the speed and capacity of the fan 10 may be initially adjusted to deliver the maximum amount of air required for the particular installation.

The fan may be further adjusted to reduce its capacity when shifting from heating to cooling, or vice versa, in accordance with the requirements of the particular installation. In the illustrated embodiment of the invention the capacity of the fan 10 is reduced by means of shutters 51, one at each side, cooperating with the air inlet openings 42 in the scroll casing 39 to restrict the flow of air to the fan. Preferably, the shutters 51 are of arcuate shape and pivotally mounted at one end on pins 52 for rocking movement on the side walls 41 of the scroll casing 39. The opposite ends of the shutters are guided by pins 53 projecting therefrom into guide slots 54 in brackets 55 attached to the side walls of the casing.

The shutters 51 are rocked on the pivot pins 52 by operating mechanism comprising the rock shaft 56 rotatably mounted in brackets 57 on the peripheral wall 43 of the fan casing and having a centrally positioned crank arm 58 extending therefrom. Crank arms 59 adjacent the ends of the rock shaft 56 are connected to the shutters 51 by links 60. A spring 61 connected between the end of the crank arm 58 and the peripheral wall 43 of the fan casing yieldingly moves the rock shaft 56 and shutters 51 to the open position illustrated by dotted lines in the drawing.

The capacity of the fan 10 can be further reduced by means of a by-pass damper 62 which also is adapted to restrict the flow of air to the fan 10. The damper 62 is positioned in the opening 21 between the evaporator 12 and absorber 19 constituting a by-pass around the cooling and heating elements 12 and 13 and through which a portion of the circulating air may flow to the fan 10. The damper 62 is pivotally mounted on a pivot rod 63 and is operated by a lever 64 connected to the damper by a link 65. A spring 66 connected to the lever 64 operates to yieldingly rock the damper 62 to closed position.

The shutters 51 and by-pass damper 62 may be operated independently or simultaneously by the servo-motor 31 when the air conditioner is shifted from heating to cooling or vice versa. For this purpose the servo-motor 31 is provided with a crank arm 67 at the opposite end of its shaft from the crank 32. The crank arm 67 is connected to the crank arm 58 for operating the shutters 51 by a flexible cable 68 enclosed in a cable housing 69. The crank arm 67 of the servo-motor 31 is also connected to operate the by-pass damper 62 by a similar cable 70 and cable housing 71. The cable 70 is connected to the crank arm 67 at one end and to the actuating lever 64 for the by-pass damper 62 at its opposite end. The ends of the cables 68 and 70 are adjustably connected to the actuating levers 58 and 64, respectively, by pin and slot connections 72 and 73 to adapt the shutters 51 and by-pass damper 62 for any predetermined movement by the servo-motor 31. The position of the shutters 51 and by-pass damper 62 also may be adjusted by drawing the cables 68 and 70 through the housings 69 and 71 to give the desired capacity to the fan 10 for the particular conditions and then attaching the ends of the cables to the crank 67.

As illustrated in the drawing the shutters 51 and by-pass damper 62 are shown in closed position with the selector valve element 30 adjusted to supply steam to the heating element or radiator 13. With this arrangement, the shutters 51 and by-pass damper 62 are additive to reduce the capacity of the fan 10 when heating to insure adequate heating of the air and increase the amount of air circulated when cooling. It will be understood, however, that the extent of movement of the shutters 51 and by-pass damper 62 can be decreased; the shutters and damper may be arranged to open instead of close on heating; or only one or the other of the shutters and damper connected to be operated by the servo-motor 31 to adapt the air conditioner for the particular operating conditions. One form of the invention having now been described in detail, the mode of operation of the illustrated embodiment is explained as follows.

For purposes of description let it be assumed that neither the heating nor cooling system of the air conditioner is in operation and that the movable valve element 30 of the selector valve, the by-pass damper 62 and the air restricting shutters 51 for the fan 10 are in the full line positions illustrated indicating a winter condition requiring heating of the air in the enclosure. Upon a decrease in the temperature of the air in the enclosure 9 heat is supplied to the boiler 26 to generate steam therein. Steam from boiler 26 flows through the valve chamber 27 and conduit 29 to the heating element or radiator 13. Preferably the operation of the fan 10 is delayed until steam has been supplied to the radiator 13 at which time air will be drawn from the enclosure 9 through the duct 7 into the conditioning chamber 6 where it will pass successively through the filter 11, cooling element 12, heating element 13, humidifier 14, and fan 10 and be delivered back to the enclosure through the duct 8.

With the by-pass damper 62 and shutters 51 closed, all of the air from the enclosure 9 is directed through the evaporator 12 and radiator 13 and as the flow of air is restricted the capacity of the fan 10 is reduced. With the fan 10 operating at reduced capacity and with all of the air delivered to the fan passing over the tubes 23 of the radiator 13, the air will be substantially heated before it enters the fan 10 for delivery to the enclosure 9. Thus, when the heated air is delivered to the enclosure 9 it will not produce any chilling effect upon the occupants and will gradually increase the temperature of the air in the enclosure as it diffuses in the air therein.

The air conditioner operates periodically in the manner described to maintain the temperature of the enclosure 9 within the predetermined limits as controlled by the thermostat 35.

When the weather changes from winter to summer conditions and it is desired to cool the enclosure 9, the controller 35 is operated either automatically or manually to energize the servo-motor 31 to cause it to rotate 180°. Upon rotation of the shaft of the servo-motor 31, the crank arm 32 operating through the link 33 and crank arm 34 shifts the movable valve element 30 from the position illustrated in full lines to that illustrated by dotted lines. Simultaneously the crank arm 67 of the servo-motor 31 operates through the cables 68 and 70 to open the by-pass damper 62 and release the rock shaft 56 for operation by the spring 61 to withdraw the shutters 51 from the air inlet openings 42 of the fan 10. The opening of the by-pass damper 62 and the withdrawal of the shutters 51 from the air inlet openings 42 increase the area of the path of flow toward the fan 10 so that the capacity of the fan increases to a maximum for the particular speed at which it was initially adjusted.

As the temperature of the enclosure 9 increases heat is supplied to the boiler 26 and steam generated therein is delivered through the valve chamber 27 and conduit 28 to the generator 17 to supply refrigerant to the evaporator or cooling element 12. The fan 10 is operated simultaneously with the supplying of heat to the boiler 26 to circulate air from the enclosure 9 through the conditioning chamber 6. As the damper 62 is opened a portion of the air flows through the by-pass opening 21 directly to the fan and another portion flows through the cooling element or evaporator 12. As the capacity of the fan 10 is increased a maximum amount of air is circulated in the enclosure 9 and the increased movement of air will produce a cooling effect on the occupants therein. A portion of the air circulated through the conditioning chamber 6 is cooled by contact with the evaporator 12 which gradually decreases the temperature of the enclosure. The refrigeration system operates periodically in the manner described to maintain the enclosure below a predetermined temperature in the summer as controlled by the thermostat 35. Therefore, with the particular arrangement illustrated and described the fan 10 operates at maximum capacity to deliver air to the enclosure in the summer when cooling is desired and the fan is adjusted to reduce its capacity during operation in the winter to insure adequate heating of the air before it is delivered to the enclosure. For particular conditions of other installations it may be desirable to reverse the operation of the fan shutters 51 and by-pass damper 62 by the servo-motor 31 to cause the fan 10 to deliver a greater amount of air when heating than when cooling or to operate either the by-pass damper 62 or shutters 51 independently to a greater or lesser extent in accordance with the particular conditions.

It will now be observed that the present invention provides an arrangement for regulating the rate of air circulation in an air conditioner to increase its flexibility and adapt it for the particular heating and cooling requirements of individual installations. It will also be observed that the present invention provides for adjusting the capacity of the circulating fan to adapt it to supply a maximum amount of air during one air conditioning operation, such as cooling, and reduce the amount of air delivered during another air conditioning operation, such as heating. It will still further be observed that the present invention provides for automatically adjusting the capacity of the fan when the air conditioner is shifted from a heating to a cooling operation or vice versa.

While a single embodiment of the invention is herein illustrated and described, it is to be understood that modifications may be made in the construction and arrangement of elements as previously explained without departing from the spirit or scope of the invention. Therefore, without limiting myself in this respect the invention is defined by the following claims.

I claim:

1. In an air conditioner, a conditioning chamber, a fan for delivering air through the conditioning chamber to an enclosure to be conditioned, a heating system having a heating element in the conditioning chamber, a refrigeration system having a cooling element in the conditioning chamber, a controller for selecting either the heating system or the cooling system for operation, said fan having a casing with an air inlet opening in the side thereof, a movable element cooperating with the fan casing to partially cover the air inlet opening and reduce the capacity of the fan, and mechanism operated by the controller for actuating the movable element.

2. In an air conditioner, a conditioning chamber, a fan for delivering air through the conditioning chamber to an enclosure to be conditioned, a heating system having a heating element in the conditioning chamber, a refrigeration system having a cooling element in the conditioning chamber, a controller for selecting either the heating system or the cooling system for operation, said fan having a scroll casing with air inlet openings in the sides thereof, a wheel in the fan casing having peripheral blades, shutters at the sides of the fan casing, and mechanism operated by the controller for moving the shutters to partially cover the air inlet openings in the fan casing to reduce the capacity of the fan.

3. In an air conditioner, a conditioning chamber, a heating system having a heating element in the conditioning chamber, a refrigeration system having a cooling element in the conditioning chamber, a controller for selecting either the heating system or refrigeration system for operation, a centrifugal fan for delivering air through the conditioning chamber to an enclosure to be conditioned, said centrifugal fan having a scroll casing with parallel side walls and a curved peripheral wall, air inlet openings in the side walls of the fan casing, a wheel mounted for rotation in the casing and having peripheral blades, arcuate shutters pivotally mounted on the sides of the fan casing, and mechanism operated by the controller for moving the shutters to partially cover the air inlet openings in the casing.

4. In an air conditioner, a conditioning chamber, a heating system having a heating element in the conditioning chamber, a refrigeration system having a cooling element in the conditioning chamber, a controller for selecting either the heating system or refrigeration system for operation, a centrifugal fan for delivering air through the conditioning chamber to an enclosure to be conditioned, said centrifugal fan having a scroll casing with parallel side walls and a curved peripheral wall, air inlet openings in the side walls of the fan casing, a wheel mounted for rotation in the casing and having peripheral blades, arcuate shutters pivotally mounted at one end on the side walls of the casing adjacent the openings therein, lever mechanism for operating the shutters, a cable connected to the lever mechanism and operated by the controller to rock the shutters and partially close the air inlet openings, and a spring connected to the lever mechanism to rock the shutters and uncover the openings when released by the cable.

5. In an air conditioner, a conditioning chamber, a heating system having a heating element in the conditioning chamber, a refrigeration system having a cooling element in the conditioning chamber, a controller for selecting either the heating system or the refrigeration system for operation, a by-pass opening around the heating and cooling elements, a damper for opening and closing said by-pass opening, a fan for delivering air through the conditioning chamber to an enclosure to be conditioned, means for adjusting the fan to change its capacity, and mechanism operable by the controller for actuating the by-pass damper and fan adjusting means to deliver different amounts of air when heating or cooling, respectively.

6. In an air conditioner, a conditioning chamber, a heating system having a heating element in the conditioning chamber, a refrigeration system having a cooling element in the conditioning chamber, a controller for selecting either the heating system or the refrigeration system for operation, a by-pass opening around the heating and cooling elements, a damper for opening and closing said by-pass opening, a fan for delivering air through the conditioning chamber to an enclosure to be conditioned and having a casing with air inlet openings in the sides thereof, shutters pivotally mounted on the fan casing and movable to partially close the air inlet openings, and mechanism operable by the controller for actuating the bypass damper and fan shutters whereby to change the capacity of the fan when shifting from heating to cooling, respectively.

7. In an air conditioner, a conditioning chamber, a fan for delivering air through the conditioning chamber to an enclosure to be conditioned, heat exchange means in said air conditioning chamber, a source of heat, apparatus operated by heat from said source to supply either a heating medium or a cooling medium to the heat exchange means, selective control means for controlling the operation of said apparatus by heat from said source to shift from heating to cooling or vice versa, said fan having a casing with an air inlet opening in the side thereof, a movable element cooperating with the fan casing to partially cover the air inlet opening and reduce the capacity of the fan, and mechanism operated by the selective control means for actuating the movable element to change the capacity of the fan when shifting from heating to cooling or vice versa.

8. In an air conditioner, a conditioning chamber, a fan for delivering air through the conditioning chamber to an enclosure to be conditioned, heat exchange means in said air conditioning chamber, apparatus for supplying either a heating medium or a cooling medium to the heat exchange means, selective control means for controlling the operation of said apparatus to shift from heating to cooling or vice versa, a by-pass opening for delivering air around the heat exchange means to the fan, and a damper to open or close the by-pass opening and connected for operation by the selective control means whereby to vary the capacity of the fan when shifting from a heating to a cooling operation or vice versa.

9. In an air conditioner, a conditioning chamber, a fan for delivering air through the conditioning chamber to an enclosure to be conditioned, a heating system having a heating element in the conditioning chamber, a heat operated refrigeration system having a cooling element in the conditioning chamber, a source of heat, a selective controller for directing heat from said source to operate either the heating system or refrigeration system, a by-pass opening for delivering air around the heating and cooling elements to the fan, a damper to open or close the by-pass opening, and mechanism connecting the controller and damper to open or close the by-pass whereby to vary the capacity of the fan when shifting from a heating to a cooling operation or vice versa.

10. In an air conditioning system, an air conduit, a constant speed fan in said conduit for flowing air therethrough, heat exchange means in said conduit, apparatus for supplying either a heating medium or a cooling medium to the heat exchange means, selective means for controlling the operation of said apparatus to shift from cooling to heating and vice versa, damper means so arranged in said conduit that it can be shifted from one to the other of two positions for maximum and minimum air supply to cause a maximum constant volume of air or a minimum constant volume of air to be delivered by said fan, means operated by said selective control means and connected to so shift said damper means as to flow the maximum constant volume of air when cooling and the minimum constant volume of air when heating, and said operated means maintaining the damper means in its fixed maximum air delivery position while the apparatus is operating on cooling and in its minimum position on heating.

PER EDBERG.

REFERENCES CITED

The following references are of record in the file of this patent:

UNITED STATES PATENTS

| Number | Name | Date |
|---|---|---|
| 1,949,735 | Bulkeley | Mar. 6, 1934 |
| 2,170,101 | Test et al. | Aug. 22, 1939 |
| 2,182,449 | Parks et al. | Dec. 5, 1939 |
| 2,257,916 | Poythress | Oct. 7, 1941 |
| 2,352,930 | Anderson | July 4, 1944 |